Oct. 2, 1951  H. R. STROUP  2,569,835
LEVELING AND SCRAPING APPARATUS WITH LEVEL MAINTAINING HITCH
Filed April 11, 1946

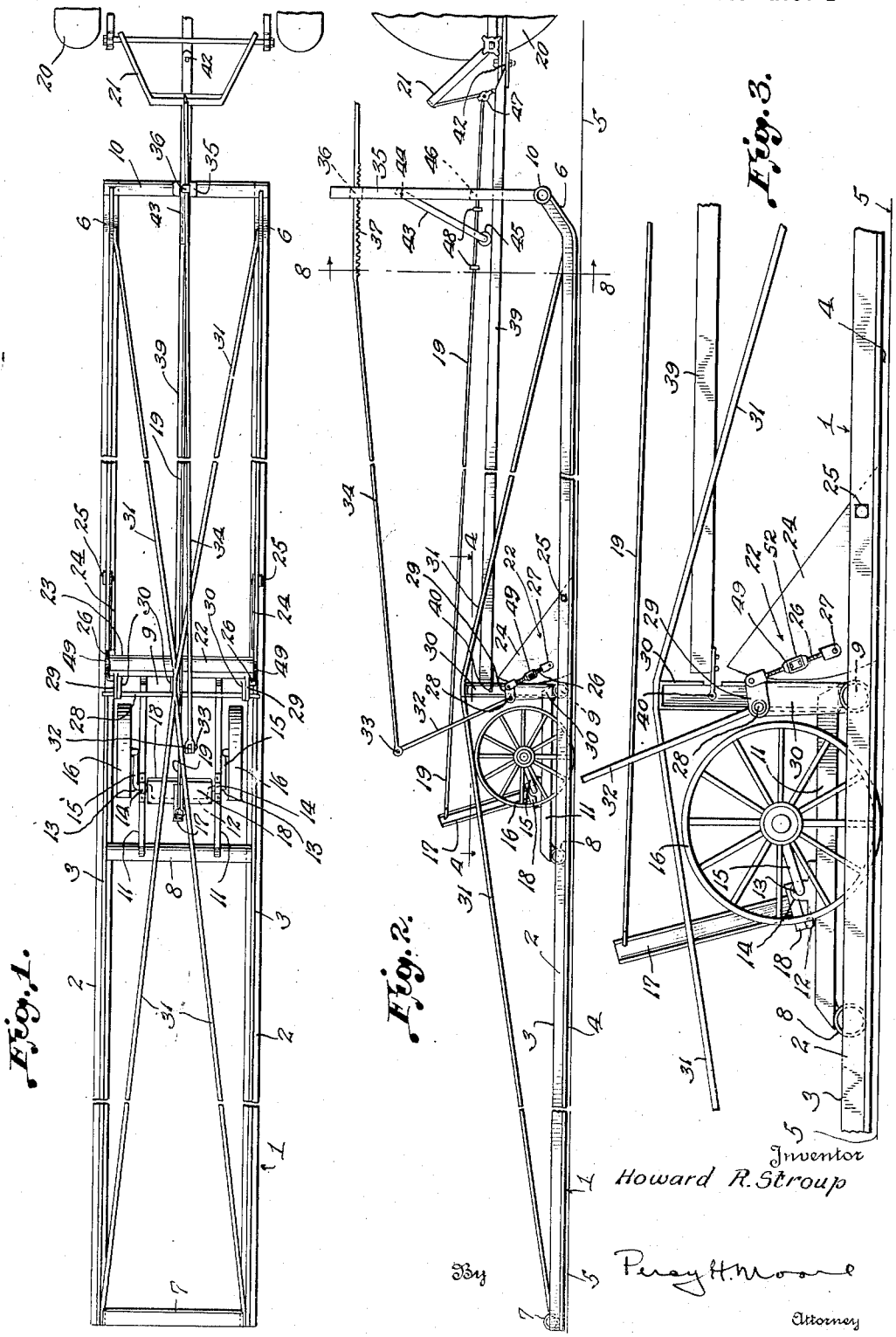

Inventor
Howard R. Stroup

Oct. 2, 1951   H. R. STROUP   2,569,835
LEVELING AND SCRAPING APPARATUS WITH LEVEL MAINTAINING HITCH
Filed April 11, 1946   3 Sheets-Sheet 3
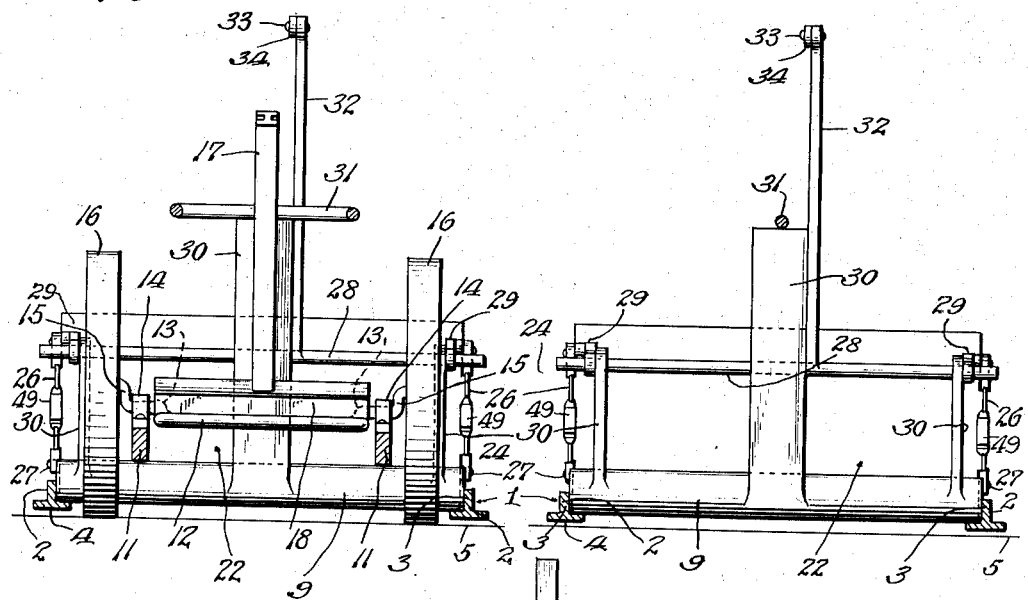
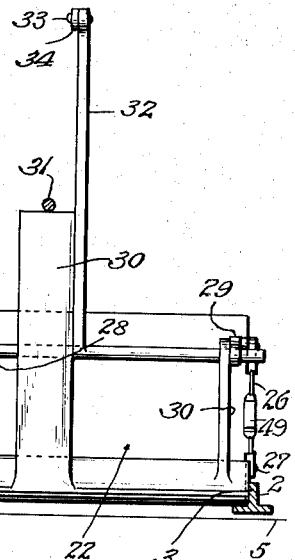
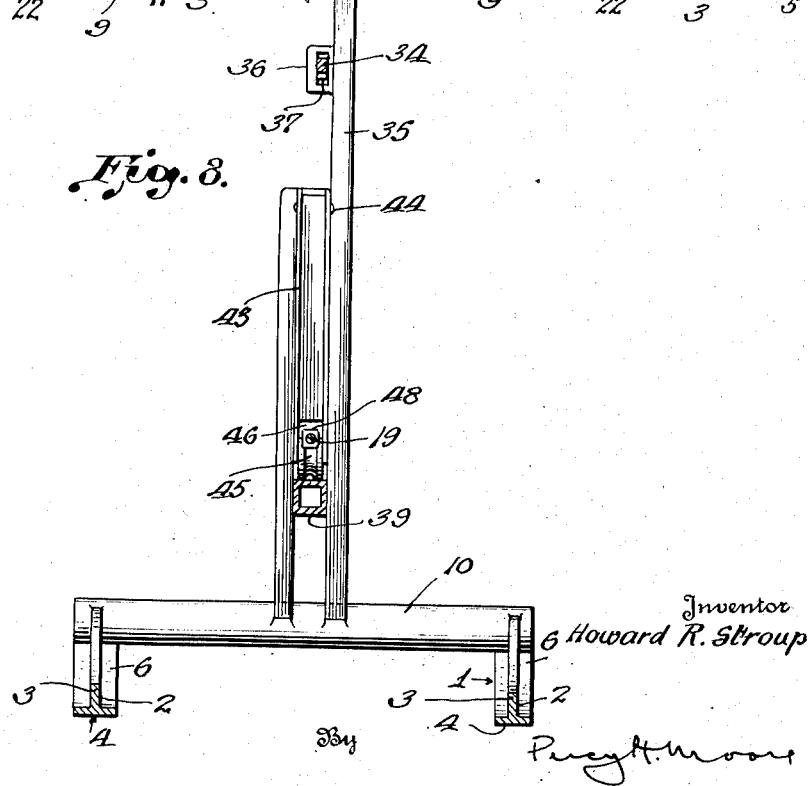

Patented Oct. 2, 1951

2,569,835

UNITED STATES PATENT OFFICE 2,569,835

LEVELING AND SCRAPING APPARATUS WITH LEVEL MAINTAINING HITCH

Howard R. Stroup, Artesia, N. Mex.

Application April 11, 1946, Serial No. 661,394

4 Claims. (Cl. 37—150)

This invention relates to a mobile ground leveling and scraping apparatus particularly adapted for use in conjunction with power equipped farm vehicles.

The principal object of the present invention is to provide a ground leveling and scraping apparatus having a mobile frame and scraping means adapted to be connected to a power equipped farm vehicle, such as a tractor, wherein means is provided for adjusting the frame and scraping means relative to the ground.

Another object is the provision of a ground leveling and scraping apparatus having a ground engaging frame with a scraper associated therewith and means for independently adjusting the frame and scraper.

Still another object is to provide a ground leveling and scraping apparatus mounted on wheels and adapted to be connected with and towed by a vehicle, such as a tractor, with means being provided for remotely adjusting the frame and scraper relative to the ground.

A further object is the provision of a ground leveling and scraping apparatus including a frame mounted on wheels and having means thereon for connecting the frame to a vehicle such as a tractor to enable the frame to be towed over and adjusted relative to the ground.

A still further object is the provision of a ground leveling and scraping apparatus including a wheel mounted ground engaging frame having a scraper thereon and means associated therewith for remotely and independently adjusting the frame and scraper during travel to facilitate scraping and handling.

These and other objects and advantages will be apparent as the specification is considered with the accompanying drawings wherein:

Figure 1 is a plan view of my improved leveling and scraping apparatus coupled to a tractor;

Figure 2 is a side elevation of the apparatus when coupled to a tractor;

Figure 3 is a side elevation of the frame elevating and scraping structure;

Figure 6 is a rear elevation partly in section taken on the line 6—6 of Figure 5;

Figure 7 is a rear elevation partly in section taken on the line 7—7 of Figure 5; and Figure 8 is a rear elevation partly in section taken on the line 8—8 of Figure 2.

Figure 4:
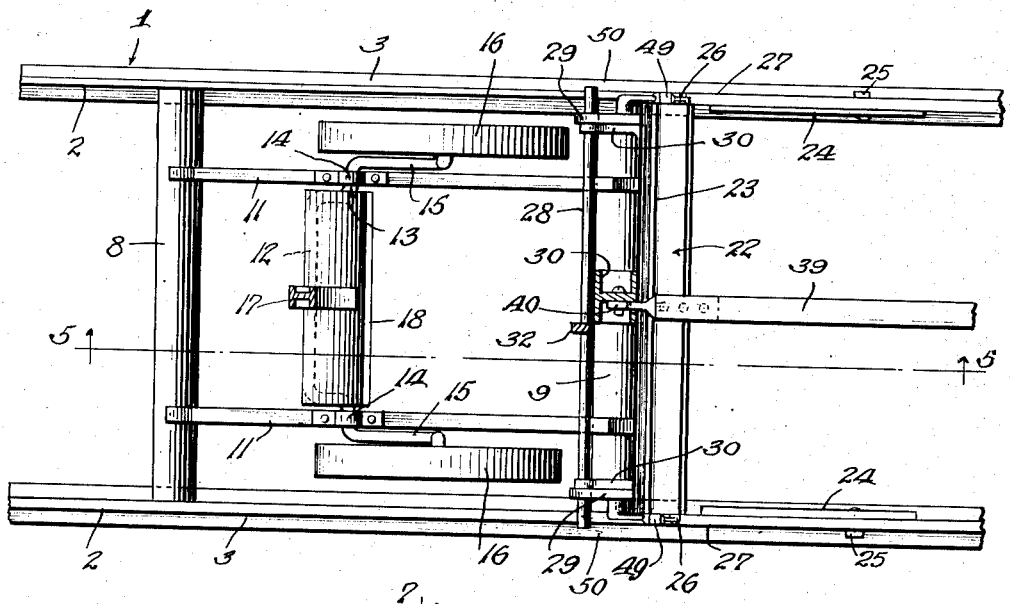
Figure 4 is a plan view partly in section taken on the line 4—4 of Figure 2.
Figure 5:
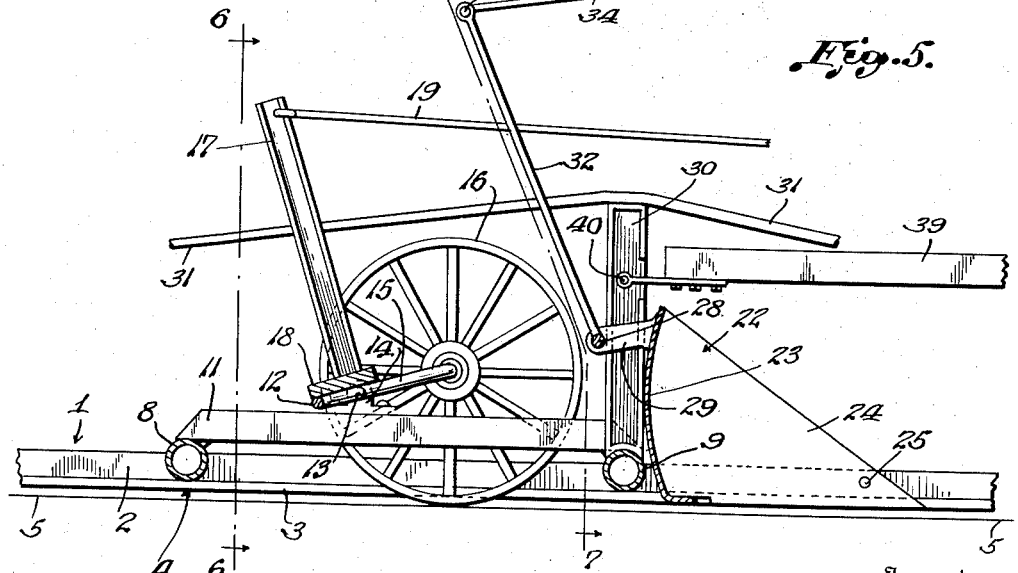
Figure 5 is a side elevation partly in section taken on the line 5—5 of Figure 4.

Referring more particularly to the drawings wherein similar reference characters designate like parts throughout the several views, numeral 1 designates a substantially rectangular ground engaging frame having spaced parallel side runners 2, preferably formed from T-shaped inverted metal beams 3 or runners, the relatively flat undersides 4 of which are adapted to rest upon and slide over the ground 5. The forward ends of the runners 2 are bent upwardly, as at 6, and are connected at their rear ends, mid sections and forward ends by cross rods 7, 8, 9 and 10, respectively. The cross rods 8 and 9 are preferably located approximately midway the length of the frame 1.

Mounted on and extending longitudinally across and suitably secured to the intermediate cross rods 8 and 9 are two spaced parallel metal supports 11. A shaft 12, extending transversely of the supports 11, is integrally formed with two relatively short forwardly and normally upwardly disposed stub arms 13 on the ends thereof. The stub arms 13 are journalled in bosses or apertured lugs 14, formed on the upper edges of the supports 11, and fixedly connected to the outer ends of the arms 13 are two crank arms 15 upon which are rotatably mounted metal spoked wheels 16. The shaft 12 is thereby offset with respect to the crank arms 15 and wheels 16. The wheels 16 are positioned approximately midway of the length of the frame 1 and, when in lowered position, extend below the plane of the runners and engage with the ground to permit of the frame being freely moved over the ground, in a manner hereinafter more particularly described.

A metal upright 17 is rigidly mounted on a base plate 18 which in turn is fixedly connected to the top of the shaft 12. One end of a cable 19 is connected to the upper end of the upright 17 and the other end thereof is connected to a power lift 21, suitably mounted on the rear end of a power driven tractor or the like 20, so that when a forward pull is exerted on the cable 19, as presently described in detail, the upright 17 is moved forwardly in a clockwise direction, viewing Figure 2. This movement of the upright 17 causes the shaft 12 to be rotated or rocked in a corresponding clockwise direction and the stub arms 13 on the ends thereof are raised with bearings 14 with the frame, while with respect to the ground they are raised about the wheel axes. Thus the crank arms 15 are lowered which results in the entire frame 1 being elevated relative to the wheels 16. This will be apparent as the specification is further considered.

A metal scraper 22, having a curved earth engaging scoop or blade 23 and forwardly extending side portions 24 thereon, is pivotally connected at the forward ends of the side members 24, as at 25, to the inner sides of the runners 2 forwardly of the cross rod 9. The lower ends of upstanding links 26 are pivoted, as at 27, to the lower rear corners of the side portions 24 and the upper ends thereof are pivotally connected to the outer ends of forwardly extending stub arms 29 carried by the ends of a shaft 28. The shaft 28 is journalled in three spaced standards or posts 30 carried by and suitably secured to the cross rod 9. The intermediate standard 30 extends above the plane of the outer standards and the upper end thereof serves as an anchor for the inner ends of struts or braces 31, the outer ends of which are connected to the front and rear of the runners 2. The struts 31 serve to brace and strengthen the frame, in an obvious manner. The lower end of an upstanding lever 32 is fixedly attached to the shaft 28 and pivotally connected, as at 33, to the upper end thereof is a forwardly extending rod 34. The rod extends longitudinally of the frame and projects through an apertured lug 36 formed on the upper end of a standard or post 35 mounted on the front cross rod 10. Ratchet teeth 37, formed on the rod 34 adjacent the outer end thereof, engage with the apertured lug 36 and serve to retain the rod in position, in an obvious manner. When it is desired to raise the scraper 22 relative to the ground, the rod 34 is elevated slightly, to clear the ratchet teeth 37 from the lug 36, and is pushed rearwardly by the operator of the tractor. This movement of the rod 34 moves the lever 32 rearwardly thus rotating or rocking the shaft 28 in a counterclockwise direction, viewing Figure 2, which imparts an upward movement to the stub arms 29 thereby raising the links 26 and elevating the scraper 22. It will be apparent that the rod 34 will be pulled forwardly by the operator to lower the scraper, in which case the lever 32 will be moved forwardly to rock the shaft 28 forwardly in a clockwise direction thereby depressing the stub arms 29 and links 26. Thus, the scraper 22 is moved downwardly about its pivot 25 into the desired position relative to the ground. The vertical adjustment of the scraper will vary the size of the cut of earth being taken as the frame is towed over the surface being scraped, as hereinafter described.

In order to assure of the scraper blade 22 being evenly disposed relative to the ground to effect an even and uniform cutting or scraping action, the links 26 are preferably in the form of conventional turnbuckles. By rotating the central portions 52 of either one or both of the turnbuckles 49 in the appropriate directions, the ends of the scraper blade 22 are caused to be elevated or depressed, in an obvious manner, so that the blade will be evenly disposed with respect to the runners. Thus, the operator can adjust the scraper, when desired, to assure of the latter operating at its maximum efficiency.

A metal draft bar 39, preferably rectangular in shape, is removably coupled, at one end, as at 40, to the upper end of the intermediate standard 30 on cross rod 9 and extends forward longitudinally of the frame 1 and projects through the bifurcated lower end of standard 35 on cross rod 10. The front end of the draft bar 39 is suitably coupled, as at 42, to the rear of the tractor 20. A rearwardly and downwardly depending fulcrum lever 43 is pivoted at its upper end 44 to the standard 35 and carries a relatively small pilot wheel 45 at the lower end thereof which rides upon the flat upper face of the draft bar 39. The previously described wheel elevating cable 19 extends through an aperture 46 formed in the lower end of the fulcrum lever 43 immediately above the wheel 45. Suitable stops 48, such as knots or clamps, are formed on the cable 19 at either side of and in abutting relation with the lever 43 so that the lever will move about its pivot and relative to the standard 35 simultaneously with movement of the cable. The cable 19 extends through the bifurcated lower end 41 of standard 35 and thence under a pulley 47 journalled in the forward end of the draft bar 39 and is connected to the power lift 21 on the tractor 20.

When it is desired to elevate the frame 1, relative to the wheels 16, to facilitate travel and maneuverability of the frame 1, the power lift 21 on the tractor is moved upwardly exerting a pull on the cable 19 and moving the metal upright 17 and wheel shaft 12, as previously described. The downward pressure of the lever 43 and wheel 45 against the draft bar 39 causes the lever 43 to act as a fulcrum for the frame 1, thereby enabling the frame and scraper to be raised or elevated relative to the wheels 16 and draft bar 39. The movement of the cable 19 pulls the fulcrum lever 43 forwardly so that the wheel 45 thereon will ride over and apply pressure against the draft bar 39. Thus, the standard 35 is pushed or lifted upwardly relative to the draft bar and the frame and scraper is raised or elevated relative to the wheels 16. That is, the lever 43 acts as a fulcrum to elevate the front end of the frame 1 while the pull of the cable moves the metal upright 17, shaft 12 and wheels 16, as previously described, so that the entire frame is raised above the plane of the wheels 16 and the latter are caused to engage and ride over the ground surface. When the frame has been elevated a desired distance above the ground, the tractor power lift 21 is stopped and the tautness of cable 19 plus the draft bar 39 serves to retain the frame in a substantially horizontal elevated position. To lower the frame into engagement with the ground, it is only necessary to depress the power lift 21 to slacken the cable 19 thereby moving the fulcrum lever 43 rearwardly about its pivot and pressure of the pilot wheel 45 is removed from the draft bar 39. Thus, the upright 17, shaft 12 and stub arms 13 are rocked rearwardly due to the weight of the frame and the crank arms 15 elevated to raise the wheels 16 out of supporting engagement with the ground. In this position, the wheels 16 continue to engage the ground but do not support the frame so that the frame runners 2 rest flatly upon and ride over the surface of the ground, as the frame is towed thereover by the tractor.

The ease with which the entire frame may be elevated or lowered by the operator of the tractor without leaving his seat is particularly advantageous in that it increases the maneuverability of the leveler permitting it to be operated in close quarters without dragging the frame. It also permits of the frame and/or scraper being elevated when transporting the frame over roads or cross country. The independent adjustment of the scraper can be readily effected for dragging small or large loads of dirt and the like.

Due to the length of the frame the runners will span low places in the terrain so that the scraper will move dirt thereinto with a leveling action. The runners also, to some extent, cut or dig into high places thereby leveling such high spots to a greater degree than would be possible with a short coupled rig.

By coupling the relatively long draft bar 39 to the post 30, substantially intermediate the length of the frame, the undulating movement of the frame in passing over rough terrain will not be communicated to the draft bar. Likewise, when the tractor drops or rises relative to the leveler, the draft bar 39 moves freely up and down relative to the standard 35 on the forward end of the frame.

While I have illustrated and described a preferred embodiment of my novel leveling and scraping apparatus, it is to be understood that various improvements and changes may be made without departing from the scope and spirit of the appended claims.

Having thus described my invention what I claim is:

1. A leveling and scraping apparatus adapted to be coupled to a tractor, a substantially rectangular frame, a vertical post on said frame, an elongated bar pivotally connected to said post and to said tractor, a pair of substantially flat spaced parallel ground engaging runners on said frame, a shaft extending across said frame, forwardly extending arms formed on the ends of said shaft and journalled in said frame, a pair of spaced wheels, and means on said wheels for connecting the wheels to said arms, an upright carried by said shaft, a scraping blade, a cable connected to said upright and said tractor, means on the front of said frame engageable with said cable and said elongated bar, and means on said tractor for moving said cable and said upright whereby a cable induced movement of the means on the front of said frame vertically moves said frame relative to said bar for retaining said runners substantially level.

2. A leveling and scraping apparatus adapted to be coupled to a tractor, a substantially rectangular frame, a vertical post on said frame, an elongated bar pivotally connected to said post and to said tractor, a pair of substantially flat spaced parallel ground engaging runners on said frame, a shaft extending across said frame, forwardly extending arms formed on the ends of said shaft and journalled in said frame, a pair of spaced wheels, and means on said wheels for connecting the wheels to said arms, an upright carried by said shaft, a cable connected to said upright and to said tractor, a scraping blade, a post on the front end of said frame and a lever pivotally connected to said post and engageable with said cable and said elongated bar, and means on said tractor for moving said cable and said upright whereby a cable induced movement of said lever vertically moves said frame relative to said bar for retaining said runners substantially level.

3. A leveling and scraping apparatus adapted to be coupled to a tractor, a substantially rectangular frame, a vertical post on said frame, an elongated bar pivotally connected to said post and to said tractor, a pair of substantially flat spaced parallel ground engaging runners on said frame, a shaft extending across said frame, forwardly extending arms formed on the ends of said shaft and journalled in said frame, a pair of spaced wheels, and means on said wheels for connecting the wheels to said arms, an upright carried by said shaft, a cable connected to said upright and to said tractor, a scraping blade, a post on the front end of said frame, and a downwardly depending lever pivotally connected at its upper end to said post and engageable with said cable, a wheel mounted on the lower end of said lever and engageable with said elongated bar, and means on said tractor for moving said cable and said upright whereby a cable induced movement of said lever vertically moves said frame relative to said bar for retaining said runners substantially level.

4. A leveling and scraping apparatus adapted to be coupled to a tractor, a substantially rectangular frame, a vertical post on said frame, an elongated bar pivotally connected to said post and to said tractor, a pair of substantially flat spaced parallel ground engaging runners on said frame, a crank shaft extending across and journalled in said frame, a pair of spaced wheels carried by said shaft, an upright carried by said shaft, a scraping blade, a cable connected to said upright and said tractor, means on the front of said frame engageable with said cable and said elongated bar, and means on said tractor for moving said cable and said upright whereby a cable induced movement of said first mentioned means vertically moves said frame relative to said bar for retaining said runners substantially level.

HOWARD R. STROUP.

REFERENCES CITED

The following references are of record in the file of this patent:

UNITED STATES PATENTS

| Number | Name | Date |
| --- | --- | --- |
| 1,595,215 | Norwood | Aug. 10, 1926 |
| 1,845,324 | Noffsinger et al. | Feb. 16, 1932 |
| 2,021,660 | Gledhill et al. | Nov. 19, 1935 |
| 2,160,193 | Arndt | May 30, 1939 |
| 2,277,889 | Shumaker | Mar. 31, 1942 |